Aug. 9, 1960     J. W. PHILLIPS ET AL     2,948,469
APPARATUS FOR COUNTING PARTICLES
Filed Aug. 8, 1955     7 Sheets-Sheet 1
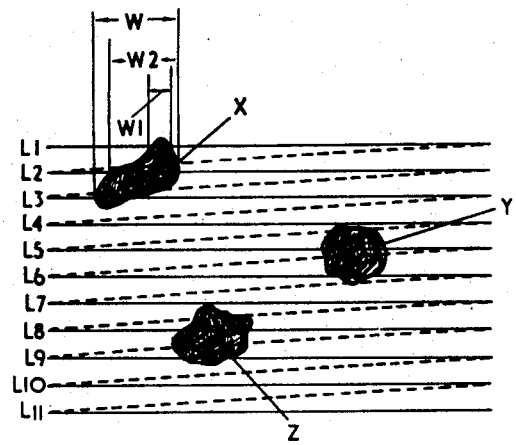
FIG. 1.
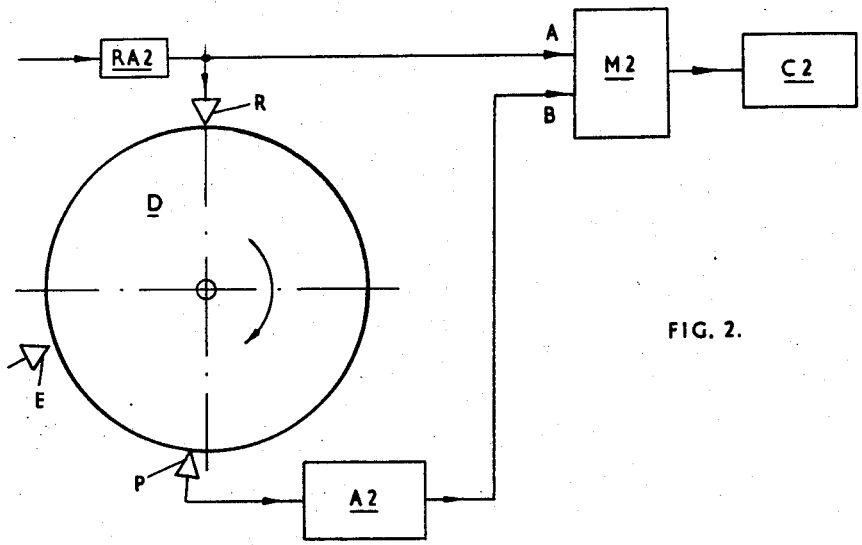
FIG. 2.
FIG. 3.
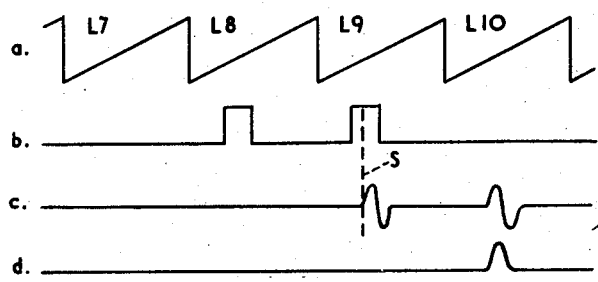

Aug. 9, 1960 J. W. PHILLIPS ET AL 2,948,469
APPARATUS FOR COUNTING PARTICLES
Filed Aug. 8, 1955 7 Sheets-Sheet 2
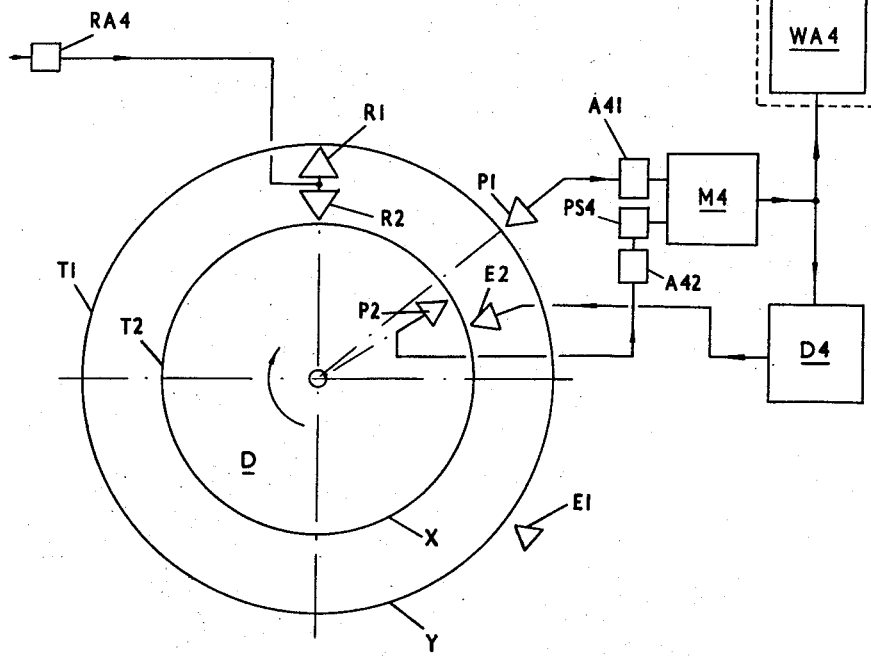
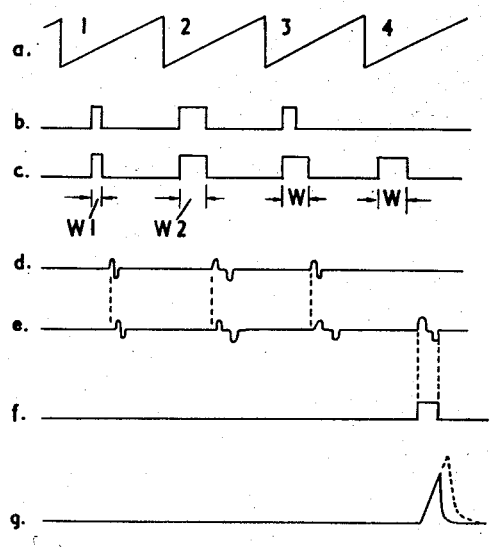

Aug. 9, 1960    J. W. PHILLIPS ET AL    2,948,469
APPARATUS FOR COUNTING PARTICLES
Filed Aug. 8, 1955    7 Sheets-Sheet 3
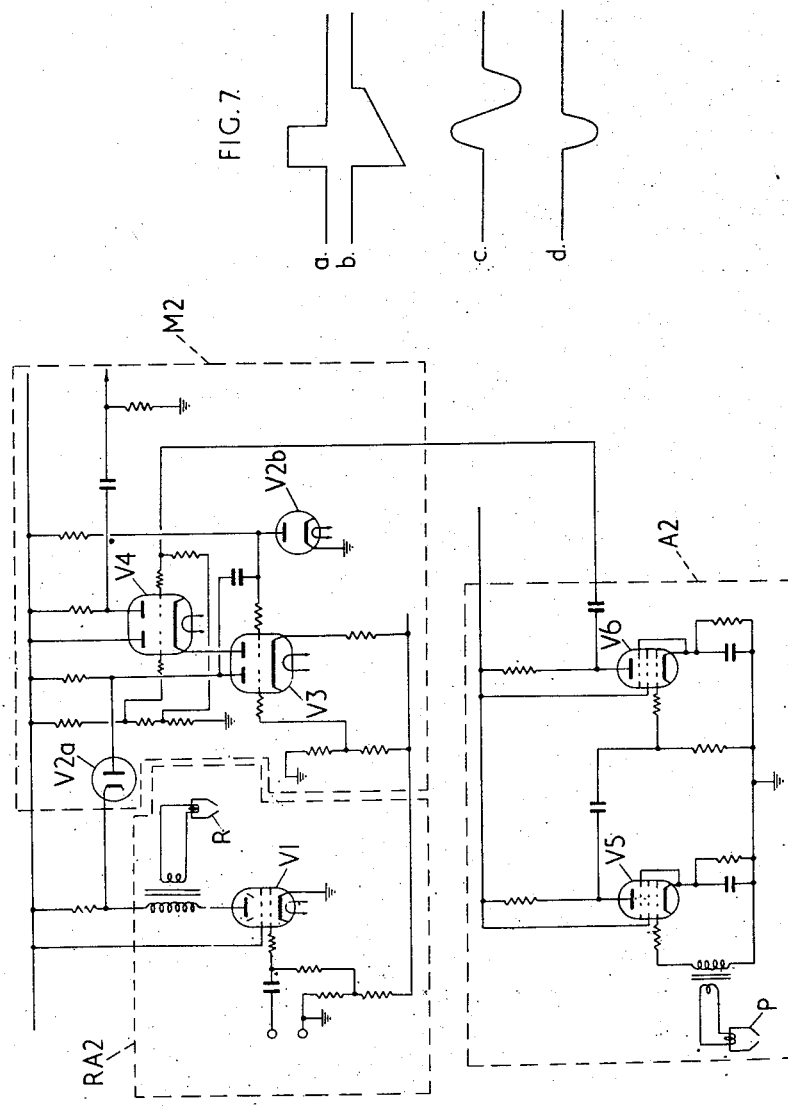

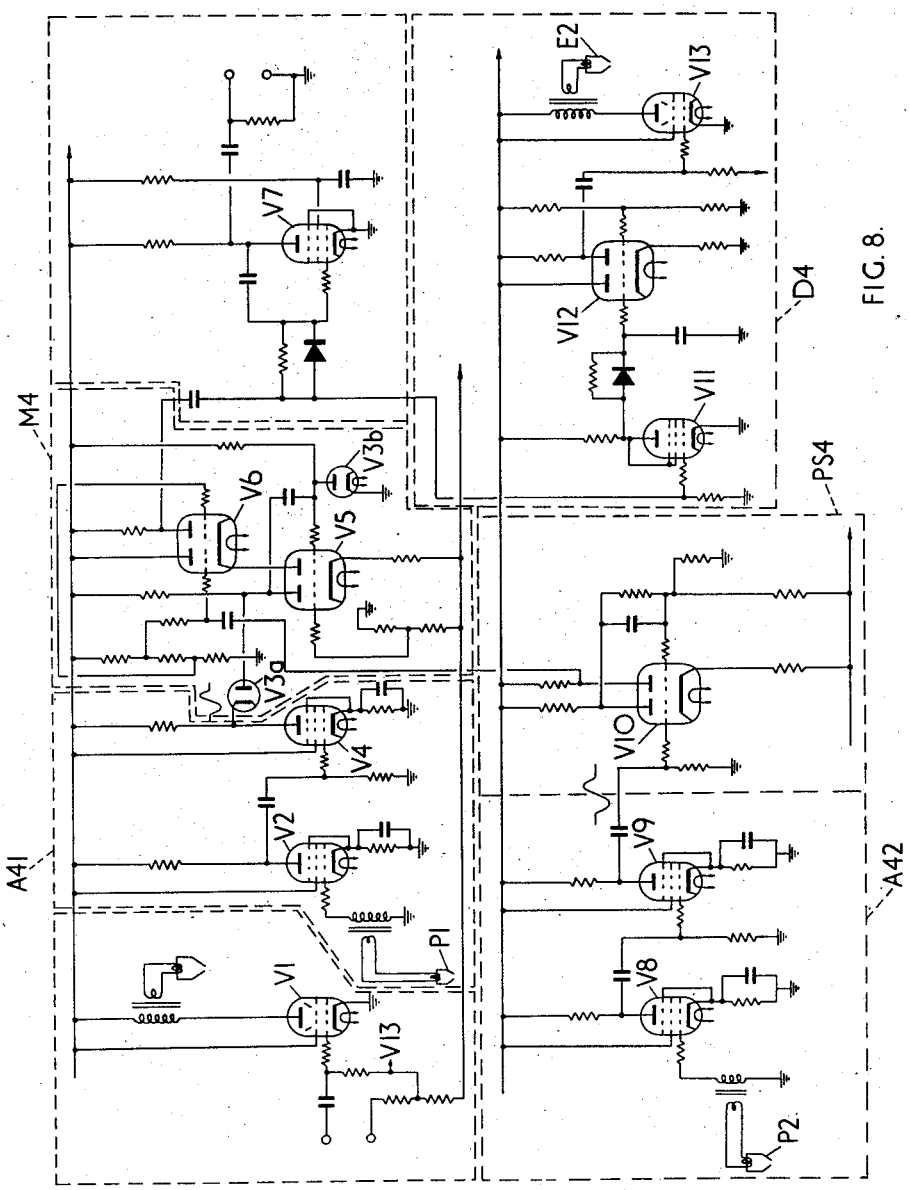

Aug. 9, 1960   J. W. PHILLIPS ET AL   2,948,469
APPARATUS FOR COUNTING PARTICLES
Filed Aug. 8, 1955                    7 Sheets-Sheet 5

United States Patent Office 2,948,469
Patented Aug. 9, 1960

2,948,469

APPARATUS FOR COUNTING PARTICLES

James William Phillips, Cheltenham, David Gurney Arnold Thomas, Deerhurst, Walton, and William Henry Walton, Byfleet, England, assignors to Coal Industry (Patents) Limited, London, England, a British company Filed Aug. 8, 1955, Ser. No. 527,092

9 Claims. (Cl. 235—92)

This invention relates to apparatus for determining the number and/or size or distribution of sizes of particles, fragments, or the like (hereinafter referred to as elements) in a collection, group, assembly or the like (hereinafter referred to as a collection) thereof.

Such determinations are, for example, of importance in investigations of dust clouds by the method in which samples of the particles in such clouds are settled on a collecting surface and the collected particles are then counted and their sizes determined. An object of the invention is to provide an apparatus for determining automatically and rapidly the total number and/or numbers of elements of various size groups in a collection thereof.

Accordingly the invention provides apparatus for determining the number and/or size or distribution of sizes of elements in a collection of elements wherein every element of the collection (or an image thereof) is scanned along a succession of substantially parallel lines by a beam of radiation or charged particles so as to produce an electric signal each time the beam traverses an element (or an image thereof) and a count is obtained of the said signals, each signal being temporarily recorded on a continuous magnetic track, that is to say continuous while scanning one field of view rotating at a speed such that one complete cycle is effected during the period of one line scan or a multiple or submultiple thereof.

According to another aspect of the invention it provides apparatus for counting the number of elements in a collection thereof, comprising means for scanning the collection of elements, or an image thereof, along a succession of substantially parallel lines by a beam of light or other radiation or charged particles so as to produce an electric signal each time the beam traverses an element, or an image thereof, means for storing or delaying each signal for a period of time approximately equal to that taken by the beam to scan one line, and means for so comparing such delayed signal with the corresponding signal, if present, in the next line of scan, that an output signal is produced only when a corresponding signal is not present in the said next line of scan. Preferably the signal is stored by recording on a moving continuous magnetic track.

Such track may conveniently be of circular form and located on the surface of a rotating drum the surface of which has been coated with a magnetic material and several such paths may be provided at axially spaced intervals along said drum.

As the scanning beam encounters each particle in turn, the impulse created by the particle is amplified and transmitted to a recording head arranged in close proximity to or touching the surface of the track so that as the track rotates past the recording head a magnetic record is made at a point on the track corresponding to the said particle. This magnetic record is subsequently picked up by a pickup head connected to a counter and the record on the track is then erased.

In one form of the invention a drum having a single magnetic track rotates through one complete revolution during the time taken to scan two lines and a magnetic signal is produced by a recording head at one point on the track and is received by a pick-up head at an approximately diametrically opposite point. The pick-up head is connected to an amplifier and counting circuit and the signal after passing the pick-up head is erased by a magnetic eraser.

In a second form of the invention, two magnetic tracks are used and the drum makes one complete revolution during the time taken to scan one line. Each particle at each interception by the scanning beam gives rise to a signal which is applied simultaneously to two recording heads at corresponding points on the two tracks. On one track the signal produced by each scan of the particle adds to the record produced by previous scans of the same particle so that when the scanning of that particle is complete, a record remains whose length is a measure of the projected diameter of the particle. On the other track the record corresponding to each interception of the particle is eliminated by a magnetic eraser before one revolution is completed. Means are provided whereby the signal is counted when the scanning beam has just finished scanning each particle and the counting means may include a width selecting circuit so that particles are graded according to their projected diameters.

In a third form of the invention the line scan intercepts of each particle are added together so as to obtain a measure of the area of the particle.

By way of example various forms of the invention will be described below with reference to the figures of the accompanying drawings:

Figure 1 is a representation of a number of particles in a field of view;

Figure 2 is a diagrammatic representation of one form of apparatus;

Figure 3 is a diagrammatic representation of voltage wave forms of signals at various points in the circuit of Figure 2;

Figure 4 is a diagrammatic repreesntation of a second form of apparatus;

Figure 5 shows the voltage wave forms of signals obtained with the apparatus of Figure 4;

Figure 6 shows one circuit suitable for use with the apparatus of Figure 2.

Figure 7 shows voltage wave forms of signals at various points in the circuit of Figure 6.

Figure 8 shows a circuit for use with the apparatus of Figure 4;

Figure 10:
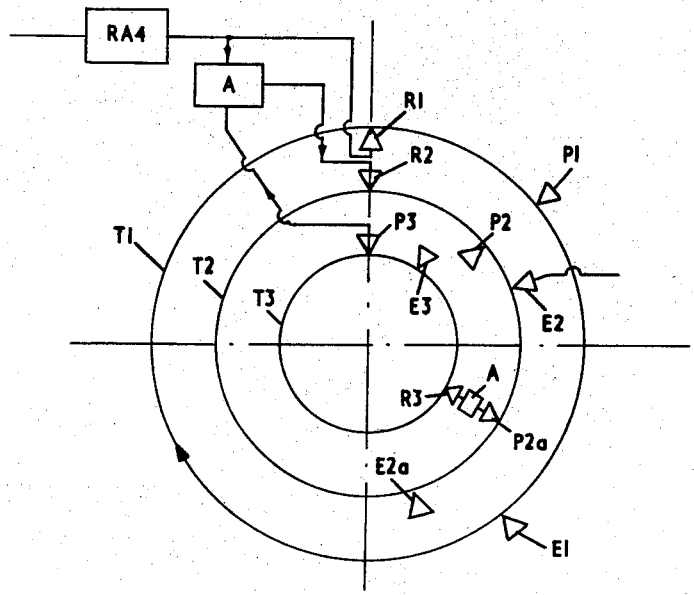
Figure 10 is a diagrammatic representation of a third form of apparatus.

Referring now specifically to the drawings Figure 1 is a diagrammatic representation of a dust sample containing three dust particles X, Y and Z and eleven scanning lines L1, L2, . . . etc., Figure 2 is a schematic diagram of one form of pulse counting apparatus. A magnetic track T on a rotating drum D makes one revolution in the time required for a scanning beam to traverse two scanning lines. The input from the scanner after passing through recording amplifier RA2 is applied simultaneously to a recording head R on the track T and to the imput A of a mixing circuit M2. A pick-up head P is mounted approximately diametrically opposite the recording head R so that an impulse recorded on the track T arrives at the pick-up head P after a time delay approximately equal to the duration of one scanning line and is then passed through amplifier A2 to mixing circuit M2. After passing the pick-up head P all records on the track T are erased by a permanent magnet E.

Figure 3 shows typical wave forms obtained at various points in the apparatus. Figure 3(a) shows the scanning wave form and Figure 3(b) the scanner output at the point of A of Figure 2. The particle Z is intercepted on scan lines L8 and L9 and the resulting wave form (Figure 3b) from the scanner is recorded on the track T and is also fed directly to the mixing circuit M2 the output from which is indicated at Figure 3(d). As hereinafter described, the mixing circuit is such that a pulse is passed to the counting unit C2 only if a pulse is received at the imput B with no corresponding pulse at imput A. This condition represents the case when a particle is intercepted on the preceding scan but not on the current scan; it arises only once for each particle i.e. when it has been fully scanned. The counting unit C2 can be of any known type.

The circuits operate on the leading edge of each pulse, and the timing of the two pulses arriving at the mixing circuit M2 may differ by a small amount depending on the shape of the particle profile. In this example it is essential that the direct pulse at input A to the mixing circuit should precede the delayed pulse at input B for satisfactory operation as indicated by the broken line s in Figures 3b and 3c and to ensure this the pick-up head P is offset or spaced by more than 180° from the recording head R, as shown in Figure 2. It would be equally possible to arrange a mixing circuit for which input A should always follow input B with the pick-up head spaced by less than 180°. The particles intercepted in one line scan are recorded on the track T and can be individually counted provided that the spacing between adjacent particles is not less than the required offsetting for varying shape of particle profile.

Figure 6 shows a suitable circuit for use with Figure 2, corresponding parts of Figures 2 and 6 being denoted by like symbols.

Figure 7 illustrates the voltage wave forms appearing in the circuit of Figure 6. Figure 7(a) shows the voltage wave form applied to the first valve V1 of the recording amplifier RA2. After amplification by valve V1, part of the signal is applied to the recording head R and the remainder of the signal actuates a flip flop V3 causing current to flow in the left hand triode section of V3. The negative going right hand grid waveform of V3 derived from the signal is shown in Figure 7(b). Figure 7(c) shows the wave form of the delayed or stored signal obtained, after amplification, from pick-up head P. This is applied to the right hand grid of a double triode V4. If V3 is in its quiescent state (i.e. right hand triode conducting owing to the absence of the negative signal of Figure 7b at the right hand grid) when the wave form shown in Figure 7(c) is received from the pick up, a pulse such as shown at Figure 7(d) is produced at the right hand anode of V4. This signal indicates that a particle has been completely scanned and the signal is fed to a counting unit of any convenient known type. If however V3 is in the activated condition (due to the presence at the right hand grid of a negative signal as in Figure 7b), no pulse is produced at the right hand anode of V4.

A modified form of apparatus suitable for counting the particles and for determining their size is shown in Figure 4.

The drum D rotates once for each line scan and the input from the scanning unit after passing through a recording amplifier RA4, is recorded simultaneously on two tracks T1 and T2 in the form of two signals respectively (not shown). The tracks T1, T2 are circular tracks of equal diameter on the surface of drum D but are shown here for convenience as concentric tracks. Pick-up heads P1, P2 are mounted at approximately the same angular positions on the tracks T1, T2 respectively except for a slight stagger as will hereinafter appear. Outputs from these pick-ups are amplified and fed to the two inputs of a mixing circuit M4. As the drum rotates the signals S1, S2 are carried past the pick-ups P1, P2 respectively. The pick-up P2 is connected to an amplifier A42, pulse shaper PS4 and mixing circuit M4 leading to counting apparatus C4 while the pick up P1 is connected to mixer M4 through the amplifier A41. The mixing circuit M4 is arranged so that so long as there are two signals S1, S2 at corresponding points on the tracks T1, T2 respectively, no signal appears at the output of the mixing circuit, and no signal is counted. If signal S1 is absent, the other signal S2 is passed by the mixing circuit to the counting apparatus C4.

The tracks T1, T2 continue to rotate until signal on track T2 reaches a magnetic eraser E2. The latter is operated from the output of M4 through the delay circuit D4 so that it removes the signal on track T2 only if there is no corresponding signal on track T1 by reason of this signal having been erased as will hereinafter appear. The width of the pulse applied to eraser E2 is arranged to remove completely the originating record on track T2. If there is a corresponding signal on track T1, eraser E2 is not operated and both signals remain and continue to move with the rotation of the drum until the eraser E1 is reached when the signal on track T1 is removed while the signal on track T2 remains.

When the signal on track T2 reaches the recording heads R1, R2, if the scanning beam is still scanning the particle, then track T1 will receive a new signal while track T2 will receive an additional signal and this process will continue until the maximum width of the particle has been reached; up to this point each new signal is of greater duration than the signal on the previous scan. Eventually a condition is reached when the scanning beam just misses the particle which has thus been totally scanned. There is then no longer a corresponding signal on track T1 and therefore when the signal on track T2 reaches pick up P2, due to the absence of a signal on a track T1 the pick up P1 will not operate, the counter switch will be closed and the signal on track T2 counted.

With the further rotation of the drum, the signal on track T2 moves past the eraser E2 and is removed because there is no longer a corresponding signal on track T1 and this completes the process of scanning the particle.

Since the length and duration of the record on track T2 will be greater than that on track T1, it is necessary to stagger the pick-ups P1, P2 and to place pick up P1 slightly in advance of pick up P2 as shown in Figure 4 to ensure that the necessary circuits are operated before the pulse from P2 arrives.

Figure 5 shows wave forms corresponding to scans L1, L2, L3 and L4 in Figure 1. The records on track T1 (Figure 5b) correspond to the intercepts of the particle on scans L1, L2 and L3 respectively and accordingly vary in width. The record on track T2 (Figure 5c) shows the intercept of width $w1$ on line L1, but this is not erased before the wider pulse corresponding to the intercept on line L2 is recorded. The pulse recorded on line L2 is therefore of width $w2$ (Figure 1). Since the magnetic track is saturated, no change of amplitude results from superimposing the pulses.

If it is desired to obtain the size distribution of the particles it will be necessary that the counting apparatus should classify the pulses received from the mixer according to their duration. For convenience the various pulse durations are converted by a simple circuit to proportionate pulse amplitudes, by a width-amplitude converter WA4. The output of this unit consisting of pulses whose amplitude distribution represents the size distribution of the counted particles is then passed to a pulse amplitude analyser AA4 of the type used for radio active measurements.

Figure 9:
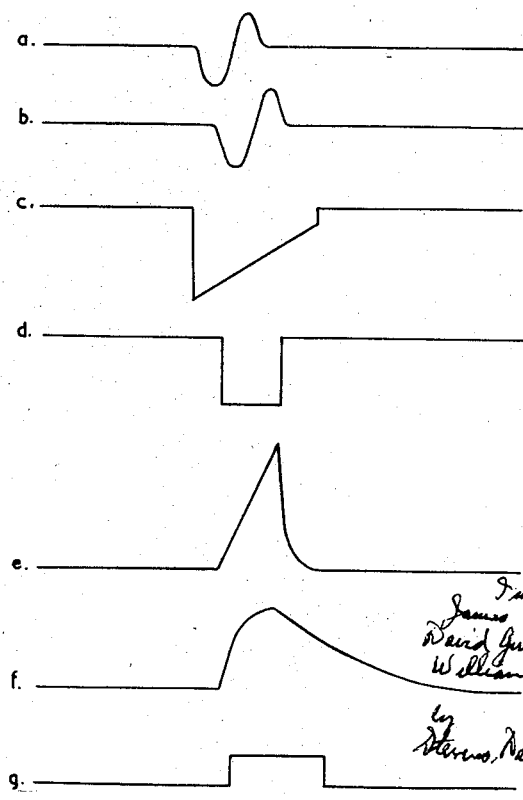
Figure 9 shows voltage wave forms of signals at various points in the circuit of Figure 8.

One suitable circuit is shown in Figure 8, and the voltage wave forms at various points in this circuit are shown in Figure 9. Figures 9a and 9b show the waveforms, after amplification, obtained from pick-ups P1, P2 respectively. The signal from pick-up P2 is shaped by valve V10 to give a signal (Figure 9d) whose width is equal to the width of the original signal recorded by recording head R2. The signals Figures 9a and 9b are passed to the mixing circuit M4 (Figure 8). The signal Figure 9d is passed via the mixer M4 to valves V7 and V11 if and only if no signal appears to pick up P1. Figure 9c shows the wave form on the right hand grid of valve V5 and is similar to that shown in Figure 7b. The output from the mixer (right hand anode V6), if present, is of the form shown in Figure 9d and is passed to the feedback integrating circuit V7. The output of valve V7 is a pluse (Figure 9c) whose amplitude is proportioned to the width of the pulse Figure 9d, and it is used to operate a pulse amplitude analyser of known type.

The output from valve V6 is also passed to valves V11 and V12, which form a delay circuit. Figure 9f shows the waveform at the left hand grid of valve V12, while the output of V12 is shown in Figure 9g. A pulse of this waveform is passed to the erase head E2 after amplification by V13.

It is necessary to synchronise the line scanning with the speed of rotation of the drum and this may be done mechanically as for example by a mirror arrangement in the case of a light beam scanner or by an auxiliary electrical track. For the latter arrangement an impulse is generated at some predetermined point in each line scanned and this is used to control the rotation of the drum. A preferred alternative is to provide an additional track on the drum which carries an impulse corresponding to the commencement of each scan line. This may be used after amplification to actuate a known electronic scanning circuit.

It may also be required to record signals as a modulated high frequency note and for this purpose a third track is provided on which is recorded a high frequency note for example 10 to 1000 kilocycles.

In a third form of the invention shown in Figure 10 the line scan intercepts of each particle are added together in amplitude so as to obtain a measure of the area of the particle. In this form the general arrangement and the amplifying, mixing and counting circuits are similar to that of Figure 4 but an additional track T3 is provided. As previously described signals are produced simultaneously at corresponding points on tracks T1 and T2 respectively and an adding circuit A is provided connected to the input from the scanning amplifier to a pick-up head P3 on track T3 and also to a recording head R2 on track T2. Following the pick-up head P3 is a permanent magnet erase head E3. At any convenient point on the drum after E2, a pick up P2a on Track T2 is arranged to feed a recording head R3 on track T3 through a suitable amplifier and pulse shaper. Pickup P2a and recorder R3 occupy the same angular position on the drum. A permanent magnet erase head E2a is mounted after P2a.

A signal from the scanning unit is applied to R1 and through the adding circuit A to R2. The signal on track T2 is transferred to track T3 via pick-up P2a and recorder R3, and deleted from track T2 by eraser E2a. As the drum rotates the signal from track T3 and signal to track T1 are added through the adding circuit A and transferred by recording head R2 to track T2, and upon further rotation of the drum the signals on track T3 are removed by eraser E3 allowing a cumulative signal on track T2 to remain on track T2. Signal on track T1 controls the counting of the signal on track T2 and is continually erased and renewed in the manner above described in connection with Figure 4. The function of eraser E2 could, if preferred, be carried out by suitably switching the circuits linking pick-up P2a and recorder R3.

This process is repeated for each line scanned until the particle has been completely scanned. The pulse shaping circuit and mixing circuit shown in Figure 8 are modified so that the amplitude of the signal passed to V7 is proportional to the amplitude of the signal recorded on the drum. The amplitude of the output signal from the anode of V7 will then be proportional to the area of the scanned particle.

Figure 11:
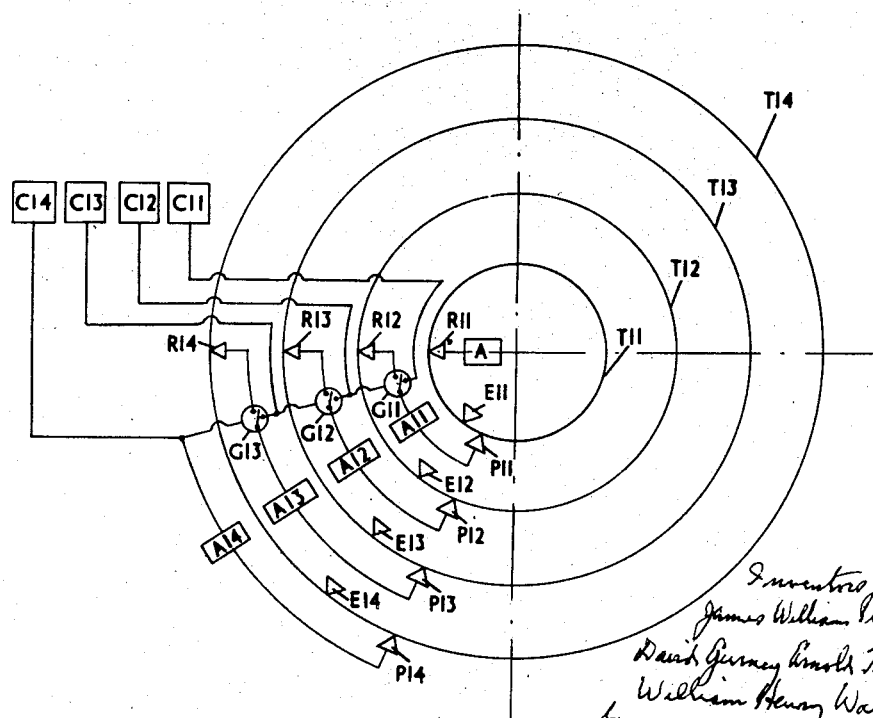
Figure 11 is a representation of a fourth form.

Figure 11 illustrates an alternative form of the invention in which a number of tracks T11, T12, T13, T14 are used, the number of these tracks being equal to the maximum number of scanned lines which the largest particle is likely to encounter. The first interception of a particle by the scanning beam will produce a signal S11 and during the rotation of the drum signal S11 is transferred from track T11 to track T12 by means of the pick-up P11 feeding recording head R12 through a suitable amplifier and shaping circuit A11. The erase heads E11, E12, etc., delete the signals after they have passed the appropriate pick-up head. The next interception of the particle produces a signal S12 on track T11 and during the next rotation of the track signal S11 is transferred from track T12 to track T13 while signal S12 is transferred from track T11 to track T12. This process is repeated until the particle is fully scanned and the next line scanned will miss the particle. Eventually signal S11 will reach the outermost track (T14 in Figure 11). When S11 passes the pick-up head P14 on track T14 electronic switches in the connections between P11 and R12, P12 and R13, etc., are operated so that P11 is connected to the counter C11 and not to R12, P12 to C12 and not to R13, etc. The signals S11, S12, etc., are therefore counted, and are subsequently deleted since owing to the operation of the electronic switch, the recording heads R12, R13, etc., are inoperative.

The manner of controlling the electronic switches from the pulse received at P14 is as follows. The pulse from P14 is amplified, shaped and used to control the electronic switch associated with P13; the pulse from P13 is used to control the switch associated with P12, and so on. The counter C11 records all pulses intercepted by four or more scanning lines, and so on, so that the indications of C11–C14 form the cumulative size distribution of the particles.

Figure 12:
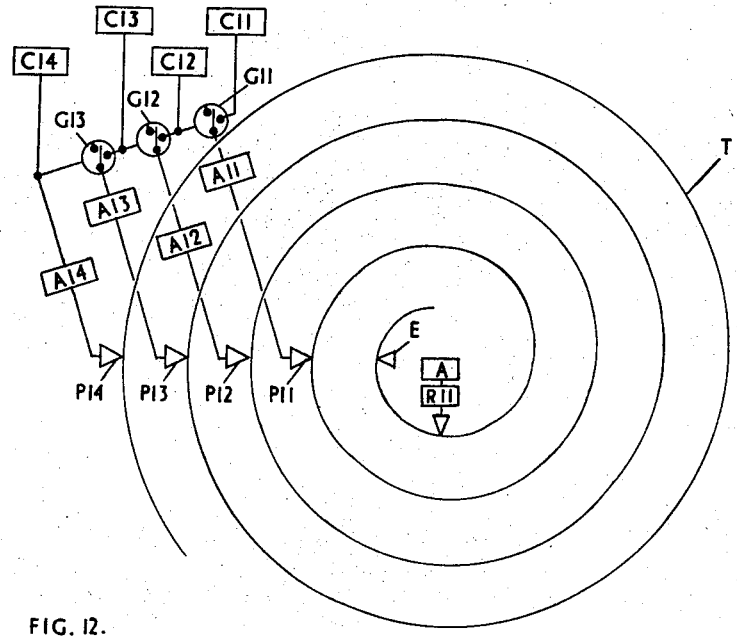
Figure 12 is a representation of a modified form of the apparatus of Figure 11.

Figure 12 shows a further modification of Figure 11 in which instead of the records being transferred from track to the next track, the track itself is in the form of a continuous helix T on a drum and the pick-up and recording heads are moved through a distance equal to the pitch of the helix during each cycle. The function of the pick-ups P11 to P14 is similar to that in Figure 11, but recording heads R12, R13 and R14, and all erase heads are eliminated. Erasing is performed on the whole drum after counting is completed. An impulse received at P14 is transmitted to C14 and also opens the channel from P13 to C13. An impulse at P13 in turn opens the next channel and so on. On the next revolution the record previously picked-up by P13 is now picked up by P14 and the process is repeated. In this way a particle intercepting (say) four scan lines is recorded as particles intercepting four, three, two and one lines respectively. The cumulative totals must be interpreted accordingly.

The last mentioned form has the disadvantage that the surface of the drum is used only once, thus requiring a large drum to scan even a limited field, and it is also necessary to re-set and erase between counts. A modification now to be described avoids these disadvantages, enables an unlimited field to be used and also permits a higher speed of scanning.

In this modification the drum has one recording head and a number of pick-up heads disposed at equal intervals around the track and all operating on the same track. The speed of scanning is synchronised to the drum so that the time taken to scan one line equals the time taken for a point on the periphery of the drum to pass from one pick-up head to the next (neglecting a possible small correction in pick-up head position to give an "anticipation time" as described below). The number of pick-up heads will depend on the ratio of the maximum to minimum size of particle to be resolved. Thus ten heads would be necessary to cover a size range of 1 to 10 microns. In addition, a further pick-up head may be used to enable oversized pulses to be rejected.

Figure 13:
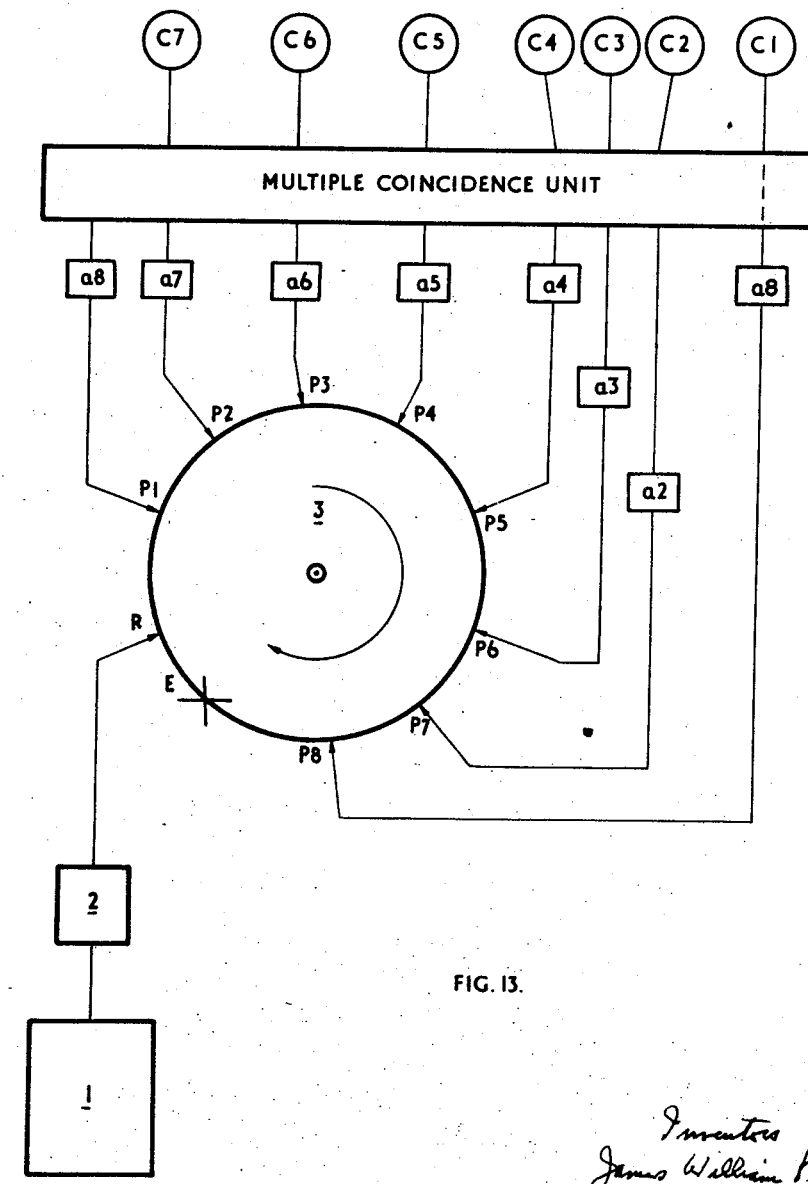
Figure 13 is a further embodiment of the invention.

Referring to the Figure 13 the scanner 1 may be of the flying spot type in which the signals are developed at a photoelectric cell. The signals are amplified by the amplifier 2. 3 is a magnetic drum having a recording head R, a number of equally spaced pick-up heads P1, P2, P3, etc., and a permanent erase head E. Signals from the pick-up heads are amplified by $a1$, $a2$, $a3$, etc., and passed to a multiple coincidence unit where they are switched and under certain circumstances passed to counters C1, C2, etc.

The scanning of the particle is effected in a manner similar to that hereinbefore described. The signals from the photocell of the scanning apparatus are recorded at R after being amplified and shaped. The first intercept of the particle is thus recorded, and after a period of time the rotation of the drum carries it around to the pick-up heads. The second intercept is similarly recorded, and when the record reaches pick-up head P1, the record of the first intercept is at pick-up head P2. The process continues, and when the record of the fifth intercept appears at P1, records of the 4th, 3rd, 2nd and 1st intercepts are at P2, P3, P4 and P5 respectively. When the record of the first intercept reaches pick-up head P8, the pulse operates the counter C1 and at the same time enters the multiple coincidence unit, preparing the circuit for the operation of C2 from P7. If a pulse arrives from P7, this prepares the circuit for the operation of C3 from P6, and so on. Thus for a particle of five intercept size counters C1, C2, C3, C4, and C5 will be operated. After a time equal (or nearly equal) to one line scan period, the second intercept will reach P8, and a similar sequence of events will be initiated, counters C1, C2, C3 and C4 being operated. When the last intercept has passed P8, the counters will have been operated as follows:

|    | No. of times operated |
|----|----|
| C1 | 5 |
| C2 | 4 |
| C3 | 3 |
| C4 | 2 |
| C5 | 1 |

The particle size can then be obtained by differencing the counter readings after the scan is complete.

Pick-up head P1 is arranged so that if pulses are present at P8, P7, P6, P5, P4, P3, P2 and P1, the count is cancelled (e.g. by impulsing all counters one step in the reverse direction, or by electrical means, or by operating an eighth counter the reading of which is afterwards subtracted from the others). This is necessary to avoid obtaining erroneous results from oversize particles.

The method by which the pulse from P8 prepares the circuit for that from P7, P7 for P6, P6 for P5, etc., in the multiple coincidence unit, ensures that the presence of a second pulse, for example that produced by a separate particle located directly above the particle being scanned is ignored until its record reaches P8.

In order to obtain the necessary anticipation time for operating the switching circuits in the multiple coincidence unit, the pick-up heads may be arranged so that the peripheral distance between them is equivalent to slightly less than the period of one line scan, or alternatively time delays may be introduced in the circuits. The anticipation required will be influenced by the extremes of particles to be counted.

The records are erased at E after passing all pick-up heads.

We claim:
1. Apparatus for determining the number and/or size or distribution of sizes of elements in a collection of elements comprising a beam of radiation or charged particles, means for traversing the beam uninterruptedly along a succession of substantially parallel lines to scan every element or image of the collection, means for producing an electric signal each time the beam traverses an element or image thereof, a plurality of continuous magnetic tracks movable together and corresponding in number to the maximum number of scanned lines which the largest element is likely to encounter and on which each signal is temporarily recorded and stored for the operation of counting circuits, said tracks moving continuously at a speed such that one complete cycle is effected during the period of one line scan or multiple or submultiple thereof, counting means cooperable electrically with the said magnetic tracks to count such signals, means for recording corresponding signals in successive scanning lines on the first of said tracks, means for transferring each signal from one track to the next during each line scanning period, means for erasing from each track a signal after it has been transferred to the next track, and electronic switches operable upon the transfer of the first signal to the last track to switch all the signals from their respective tracks to corresponding counters.

2. Apparatus for counting the number of elements in a collection thereof comprising a beam of radiation or charged particles, means for scanning the collection of elements or an image thereof by moving said beam continuously along a succession of substantially parallel lines, means for producing an electric signal each time the beam traverses an element, a continuously moving track means, means for storing or delaying each signal on the continuously moving track means for a period of time approximately equal to that taken by the beam to scan one line, means for comparing said delayed signal with the corresponding signal in the next line of scan, means for producing an output signal whenever a corresponding signal is not present in the next line of scan, said track means comprising a first track and a second track, said tracks moving together, means for recording a signal due to the interception of an element during a line of scan simultaneously on both said tracks, a mixer, means for applying a signal from the record on the said first track to said mixer slightly in advance of a signal from the record on said second track, and means for subsequently erasing the record on said first track during the line scanning period, said record on said first track being restored by the interception of the element during the next line of scan, the mixer being such that an output signal is produced only if said record is not restored.

3. Apparatus as claimed in claim 2, including an eraser for the record on the second track, said eraser being energised by the output from said mixer, said eraser being operated to erase the record on said second track by a signal from the mixer due to the absence of a recorded signal on said first track.

4. Apparatus as claimed in claim 2 including a pulse shaper, means for feeding the signal derived from the record on said second track to said mixer through said pulse shaper, said pulse shaper giving a signal of which the width is equal to the width of the original recorded signal, a counter including a width-amplitude converter and a pulse amplitude analyser, and means for feeding the output from said mixer to said counter.

5. Apparatus as claimed in claim 2 including means for adding together the line scan intercepts of each element, said addition providing a measure of the area of the element.

6. Apparatus as claimed in claim 5 wherein said adding means comprises a third magnetic track, means for recording on said third track signals derived from the second track, signal derived from said third track being added to the signals recorded directly on the second track from the scanner whereby a cumulative record is obtained on the second track.

7. Apparatus for determining the number and/or size or distribution of sizes of elements in a collection of elements comprising a beam of radiation or charged particles, means for traversing the beam uninterruptedly along a succession of substantially parallel lines to scan every element or image thereof of the collection, means for producing an electric signal each time a beam traverses an element or image thereof, a continuous magnetic track on which each signal is temporarily recorded and stored for the operation of counting circuits, said track moving continuously at a speed such that one complete cycle is effected during the period of one line scan or a multiple or submultiple thereof, counting means cooperable electrically with said magnetic tracks to count said signals, said track being in the form of a continuous helix, the number of convolutions of said helix corresponding to the maximum number of scanned lines which the largest element is likely to encounter, means for recording corresponding signals in successive scanning lines on the first convolution of said helix, means for transferring each signal from one convolution to the next during each line scanning period, means for moving said signal transferring means through a distance equal to the pitch of said helix during each cycle, means for erasing from each convolution a signal after it has been transferred to the next trace, and electronic switches operable upon the transfer of the first signal to the last convolution to switch all the signals from their respective convoltuions to corresponding counters.

8. Apparatus for determining the number and/or size or distribution of sizes of elements in a collection of elements comprising a beam of radiation or charged particles, means for traversing the beam uninterruptedly along a succession of substantially parallel lines to scan every element or image thereof of the collection, means for producing an electric signal each time a beam traverses an element or image thereof, a continuous magnetic track on which each signal is temporarily recorded and stored for the operation of counting circuits, said track moving continuously at a speed such that one complete cycle is effected during the period of one line scan or a multiple or submultiple thereof, counting means cooperable electrically with said magnetic tracks to count said signals, said track being in the form of a single rotatable circular magnetic track, a single recording head co-operating with said track, means for applying signals from the scanner to said recording head, a plurality of pick-up heads disposed at equal intervals around the track and all operating on said track, means for synchronising the speed of scanning with the rotating track so that the time taken to scan one line is equal to the time taken for the record of a signal on the track to pass from one pick-up head to the next, a single erasing head, means for producing a pulse when the record of the first signal reaches the last pick-up head, a counter operated by said pulse, a multiple coincidence unit into which said pulse enters simultaneously to prepare the circuit for the operation of a second counter by the next pick-up head, said second counter if energised by a pulse also preparing the circuit for the operation of a corresponding counter from the next pick-up head, and so a signal reaches the last pickup head until all of the signals corresponding in number to the number of intercepts of the element have passed said last pick-up head.

9. Apparatus as claimed in claim 8 including means for cancelling the count if pulses are present at all the pick-up heads, whereby erroneous results due to oversize particles are avoided.

References Cited in the file of this patent

UNITED STATES PATENTS

| 2,494,441 | Hillier | Jan. 10, 1950 |
| 2,791,697 | Dell | May 7, 1957 |

OTHER REFERENCES

"A Pulse Length Sorter and Counter," by Parent and Schumann, from Proceedings of the National Electronics Conference, volume 5, 1950, pages 72–82.

"The Physics of Particle Size Analysis," British Journal of Applied Physics, Supplement No. 3, published by the Institute of Physics, 47 Belgrave Square, London, S.W. 1, pages S123 and S124 relied on.